United States Patent
Natanzon et al.

(10) Patent No.: US 9,128,628 B1
(45) Date of Patent: Sep. 8, 2015

(54) DYNAMIC REPLICATION MODE SWITCHING

(71) Applicant: EMC Corporation, Hopkinton, MA (US)

(72) Inventors: Assaf Natanzon, Tel Aviv (IL); Xiali He, Upton, MA (US); Arieh Don, Newton, MA (US); Mark J Halstead, Holliston, MA (US); Saar Cohen, Mishmeret (IL)

(73) Assignee: EMC Corporation, Hopkinton, MA (US)

( * ) Notice: Subject to any disclaimer, the term of this patent is extended or adjusted under 35 U.S.C. 154(b) by 161 days.

(21) Appl. No.: 13/798,552

(22) Filed: Mar. 13, 2013

(51) Int. Cl.
*G06F 13/00* (2006.01)
*G06F 13/28* (2006.01)
*G06F 3/06* (2006.01)
*G06F 11/14* (2006.01)

(52) U.S. Cl.
CPC ............ *G06F 3/065* (2013.01); *G06F 11/1458* (2013.01); *G06F 11/1464* (2013.01); *G06F 2201/84* (2013.01); *G06F 2201/86* (2013.01); *G06F 2201/875* (2013.01)

(58) Field of Classification Search
CPC . G06F 3/065; G06F 11/1464; G06F 11/1458; G06F 2201/84; G06F 2201/86; G06F 2201/875
See application file for complete search history.

(56) References Cited

U.S. PATENT DOCUMENTS

| | | | |
|---|---|---|---|
| 2003/0041074 A1* | 2/2003 | Vasudevan et al. | 707/204 |
| 2006/0195666 A1* | 8/2006 | Maruyama et al. | 711/162 |
| 2013/0226870 A1* | 8/2013 | Dash | 707/634 |

* cited by examiner

*Primary Examiner* — Edward Dudek, Jr.
(74) *Attorney, Agent, or Firm* — Krishnendu Gupta; Joseph D'Angelo

(57) ABSTRACT

A method, system, and computer program product for data replication, comprising dynamically changing between snapshot hot push and continuous replication; wherein snapshot hot push denotes a replication mode where a snapshot is pushed from the production site to the replication site while IO occurs to the production site.

16 Claims, 15 Drawing Sheets

DYNAMIC REPLICATION MODE SWITCHING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and computer program product for data replication, comprising dynamically changing between snapshot hot push and continuous replication; wherein snapshot hot push denotes a replication mode where a snapshot is pushed from the production site to the replication site while IO occurs to the production site.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
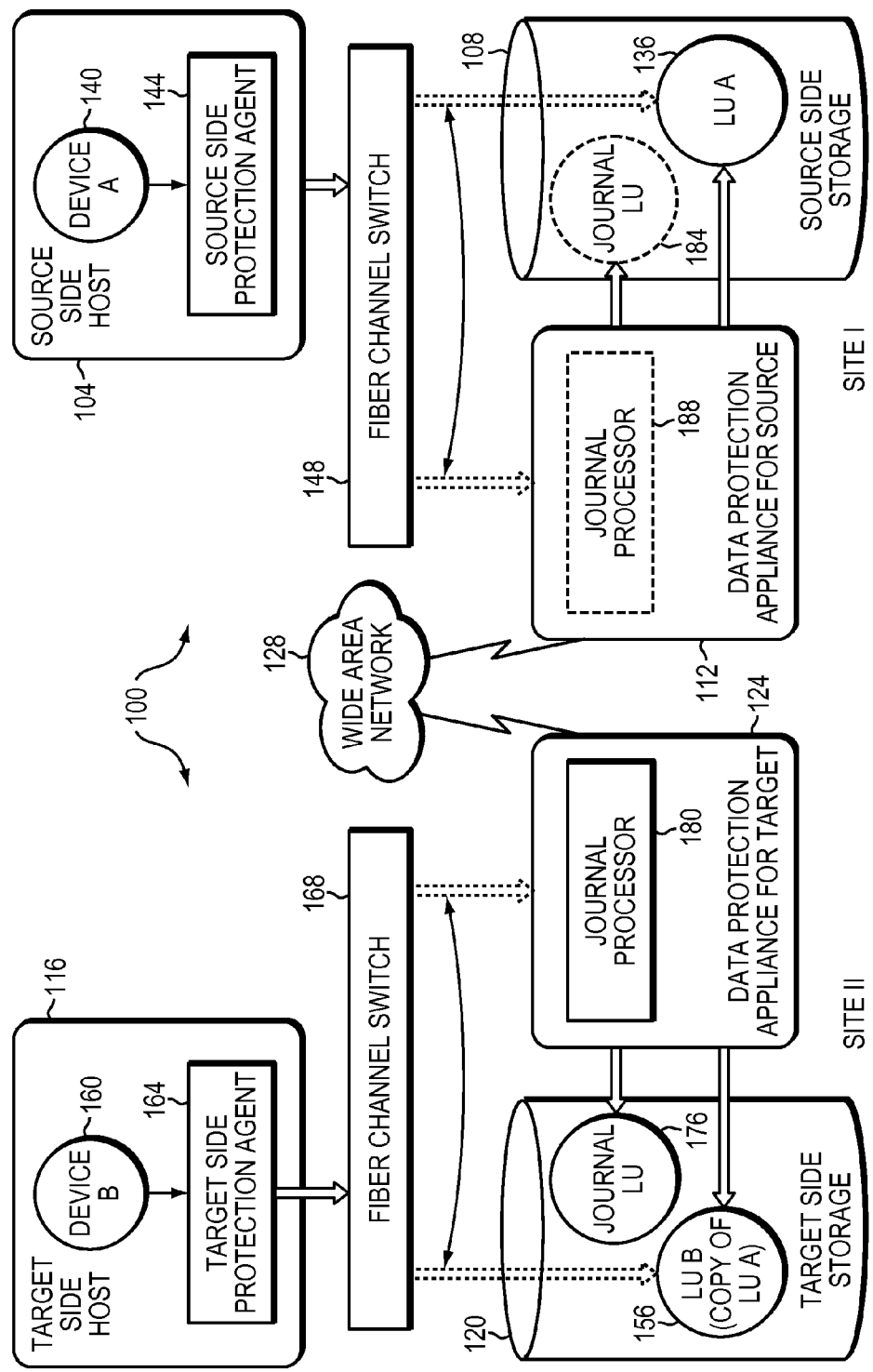
FIG. 1 is a simplified illustration of a data protection system, in accordance with an embodiment of the present disclosure.

Traditionally, moving between continuous replication, where an IO is acknowledged as replicated before it is written to storage, and snapshot based replication, where snapshots are sent from a production site to a replication site, is complex and may not have been possible dynamically. Conventionally, traditional continuous replication provided an ability to move to any point in time but required a high latency due to sending each IO synchronously to a replication appliance prior to acknowledging it to host. Generally, snapshot based replication has a lower latency but may not offer the ability to move to any point in time, and may increase the number of reads on the production storage.

In certain embodiments, the current disclosure may enable a replication system to move dynamically between continuous replication and snapshot based replication. In most embodiments, the ability to move between continuous and snapshot replication may enable a lower latency and greater ability to move to a point in time (PIT). In further embodiments, the current disclosure may enable a replication system to move between snapshot and continuous replication based on latency. In other embodiments, switching between replication types may occur automatically. In further embodiments, the switch may be based on user input.

In some embodiments, a switch may be made from continuous replication to snapshot replication by beginning to track changes in a dirty bitmap. In other embodiments, in snapshot replication, during a snapshot push the dirty bitmap may be used as a bitmap to track what changes are transferred to a replication site and a second dirty bitmap may be used to track changes. In further embodiments, during snapshot replication, if a write is to occur to a portion to be transferred to the replication site, a copy on first write may be used to transfer the data to the replication site before it is overwritten. In certain embodiments, if the type of replication is switching from snapshot replication to continuous replication, the system may replicate all new IO continuously while a background process may transfer unsynchronized data marked by a dirty bitmap.

In some embodiments, replication may create logical point-in-time copies without having to allocate additional disk space, while I/O may be permitted against the source volume during the transfer. In certain embodiments during a hot push (i.e. when pushing a snapshot of a point in time of the volume while IOs arrive to the volume), if an application attempts a write to a location whose original point-in-time data has not yet been copied to the remote device, then Copy on First Write (COFW) may apply, which may delay host I/O until the data is on the replication appliance. In most embodiments, the initial hot push may be a full copy (i.e. when pushing a snapshot of a point in time of the volume for the first time while IOs arrive to the volume). In certain embodiments, there may be an option to include differential information. In some embodiments, the differential information may be used when the hot push is recreated and activated. In certain embodiments, using differential information the incremental data and pushing incremental changes may be sent from the previous activate. In certain embodiments, active snapshot replication may be referred to as hot push. In certain embodiments used herein, a snapshot may be used to refer to a point in time which is denoted by a dirty bitmap and an image on storage. In most of these embodiments, a snap of the data may not explicitly exit rather the snapshot may be a logical construct based on the image and the dirty bitmap. In most embodiments, hot push or snapshot replication and continuous replication may be forms of asynchronous replication.

The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

VIRTUAL VOLUME: may be a volume which is exposed to host by a virtualization layer, the virtual volume may be spanned across more than one site and or volumes VASA: may be a set of vCenter providers that allow an administrator to manage storage Virtualization filter appliance (VFA): may be a layer in the hypervisor that has the ability intercepts and split IO from a VM being written to a virtual disk. In some embodiments, the VFA may be running on a VM in a hypervisor This is an out of mechanism that allows storage management over web based APIs.

VVOL-filter—may be a VM utilizing a specialized Virtual machine, which may provide an infrastructure that allows for introducing a "device driver" into the virtualized IO stack provided by the Virtual machine Virtual RPA (vRPA)/Virtual DPA (vDPA): may be an DPA running in a VM.

VASA may be vSphere Storage application program interfaces (APIs) for Storage Awareness.

DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, and METHODS AND APPARATUS FOR OPTIMAL JOURNALING FOR CONTINUOUS DATA REPLICATION and with U.S. Pat. No. 8,332, 687, which are hereby incorporated by reference. A description of synchronous and asynchronous replication may be described in the patent titled DYNAMICALLY SWITCHING BETWEEN SYNCHRONOUS AND ASYNCHRONOUS REPLICATION and with U.S. Pat. No. 8,341, 115, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Iournaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
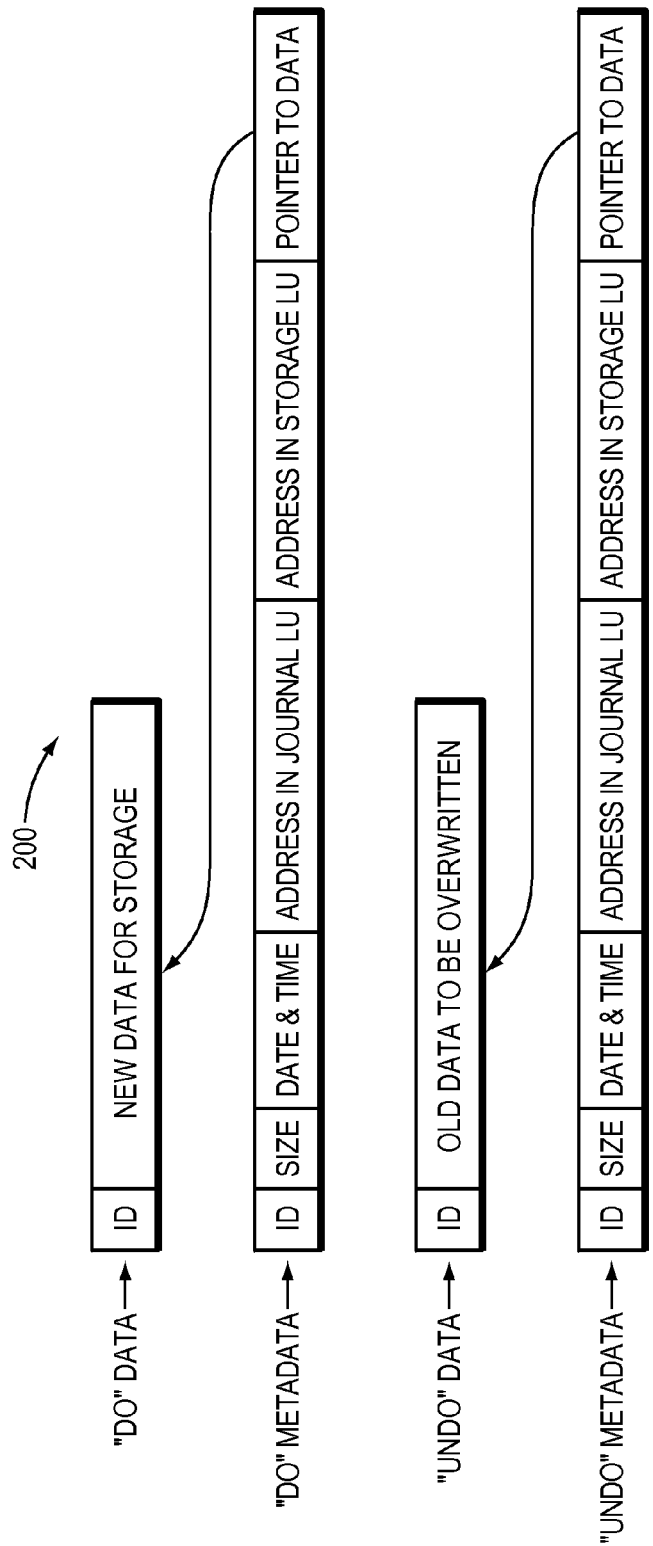
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields: one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter may mirror write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWERPATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access.

Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward. Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of the different locations between local and remote sites. For example, a delta marking stream at the target might have data too if a user has accessed an image at the target site.

The initialization process may create one virtual disk out of the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Continuous Replication

Figure 3:
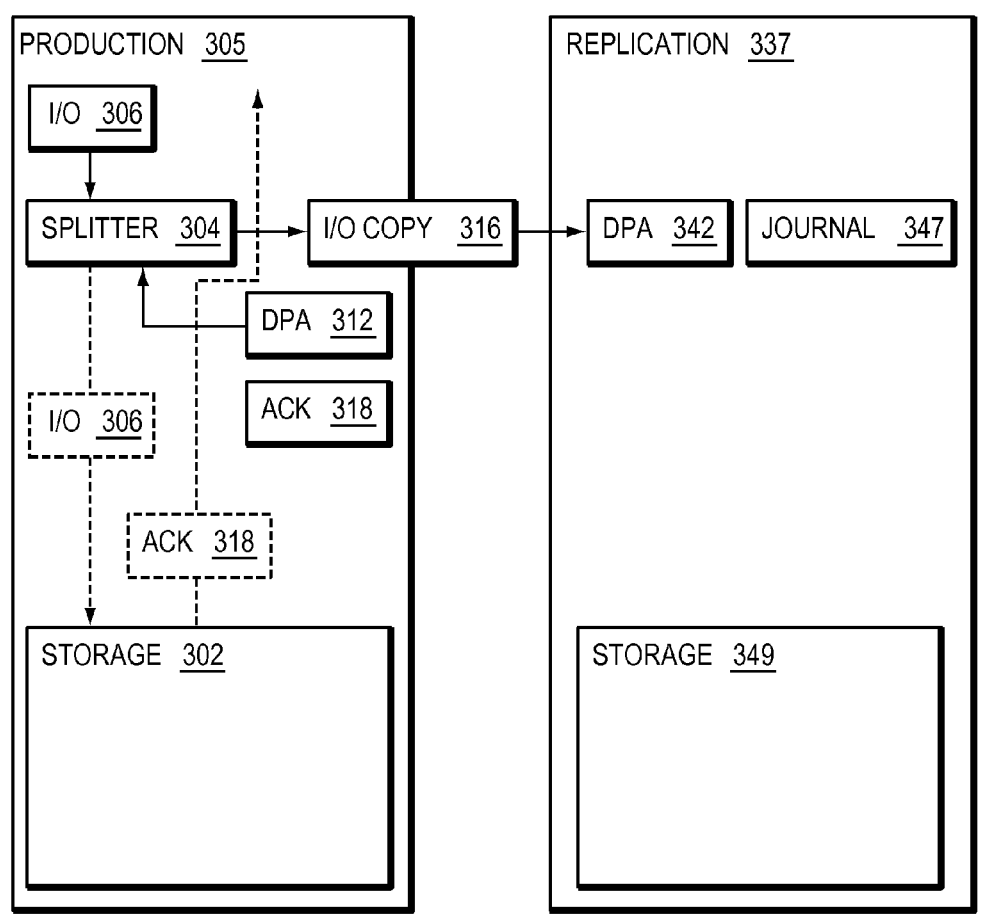
FIG. 3 is a simplified illustration of a data protection system during continuous replication, in accordance with an embodiment of the present disclosure.
Figure 4:
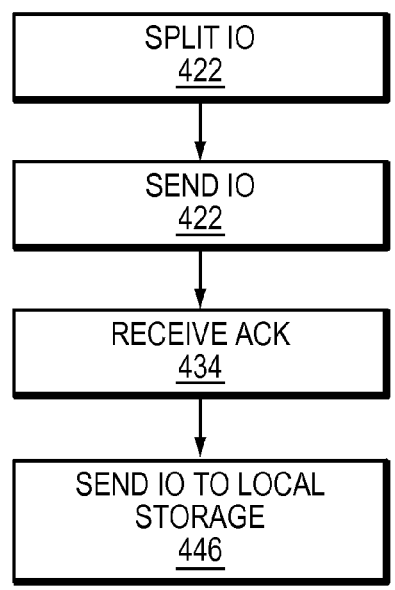
FIG. 4 is a simplified example of a method for continuous replication, in accordance with an embodiment of the present disclosure.

Refer now to the example simplified example embodiments of FIGS. 3 and 4, which illustrates continuous replication. Production site 305 has splitter 304, which intercepts IO 306 being sent to storage 302. Splitter 304 creates IO copy 316 (step 402). Splitter 304 sends IO copy 316 to DPA 312. DPA 312 sends I/O copy to DPA 342 on replication site 337 (step 422) and acknowledges splitter 304. Splitter 304 on production site 305 receives ACK 318 (step 434). Splitter 304 sends IO 306 to storage 302 (step 446) and acknowledge IO to the host generating the IO by sending Ack 328 to the host. In this simplified embodiment, IOs from that reach splitter 304 are not acknowledged to the host until an acknowledgement, such as Acknowledgement 318, is received from the replication appliance (DPA 312) denoting that the IO has reached replication appliance 312.

In certain embodiments, this type of continuous replication may create an increased response time for processing the IO, since the IO cannot be acknowledged before it is sent to DPA 312. In most embodiments, the increased response time time may slow an application on production site 305 waiting for an acknowledgement that the has been processed. In other embodiments, when there is sufficient increase in response time from replication, an application may be slower on a host or to a user.

Snapshot Push Replication

Figure 5:
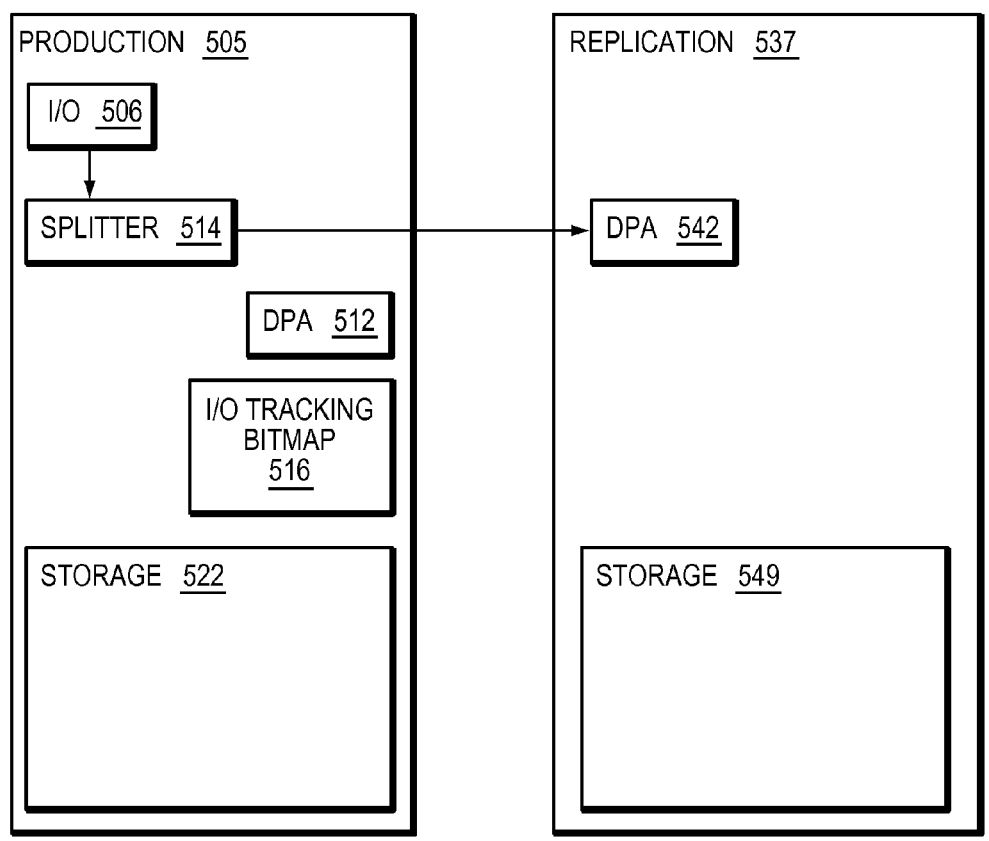
FIG. 5 is a simplified illustration of a data protection system during initialization of snapshot replication, in accordance with an embodiment of the present disclosure.
Figure 6:
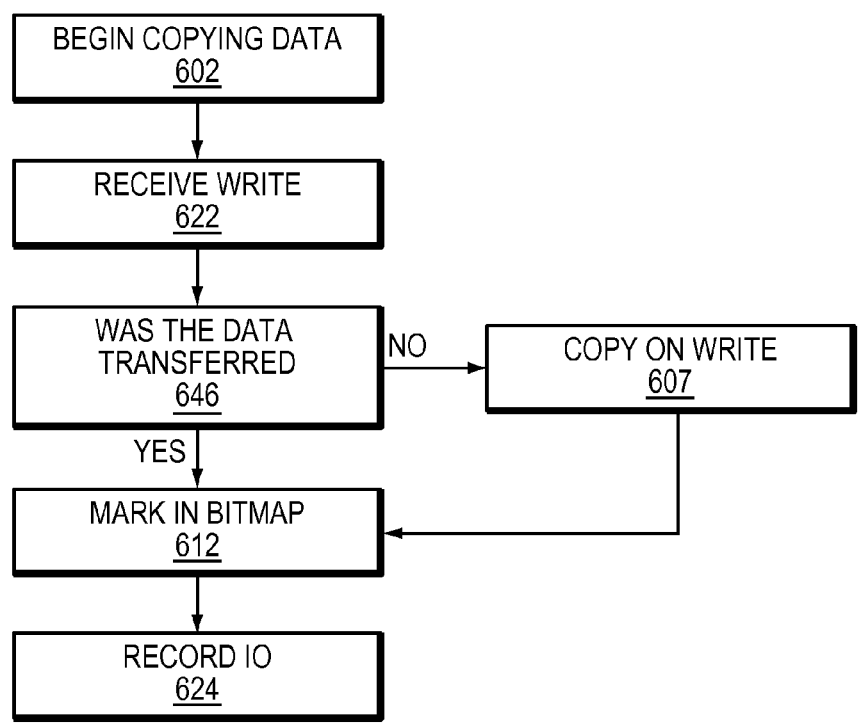
FIG. 6 is a simplified example of a method for initializing snapshot replication, in accordance with an embodiment of the present disclosure.

Refer now to the simplified embodiment of FIGS. 5 and 6, which show an initialization process for snapshot replication. Production site 505 has splitter 514, DPA 512, IO tracking bitmap 516, and storage 522. Production site is in the process of initializing a first snapshot on replication site 537, which has DPA 542 and storage 549. Production site 505 transfers snapshot image on storage 522 to replication site 537 (step 604) by reading the data by the splitter and sending it to the replication appliance. If a write occurs on production site (step 602), such as write 506, this write may be directed to a portion of the image that has not yet been transferred to replication site 537 (step 646).

In the case the write, such as write 506, is directed to a portion of the image not yet transferred, then portion of the image corresponding to the write is transferred from production site 505 to replication site 537 (step 607) i.e. the host IO is delayed until the current data of the storage is read and pushed to the replication appliance DPA 512. The portion of the image corresponding to write IO 506 is marked as dirty in tracking bitmap 516 (step 612). IO 506 is written to storage 522 on production site. After the data in the image on production site 505 has been transferred to replication site 537, IO tracking bitmap 516 corresponds to the portions of the image that have changed during the snapshot push to replication site 537. After the data has been transferred, IO tracking bitmap 516 continues to mark data that changes on production site.

In most embodiments, there may not be a snapshot or snapshot copy on the production site. In certain embodiments, there may be a bitmap of the changes on the production volume. In some embodiments, the bitmap may track the changes of the snapshot to be pushed to the replication site. In further embodiments, when the snapshot is being pushed the IOs to a location to be pushed may be delayed until the data is pushed.

Figure 7:
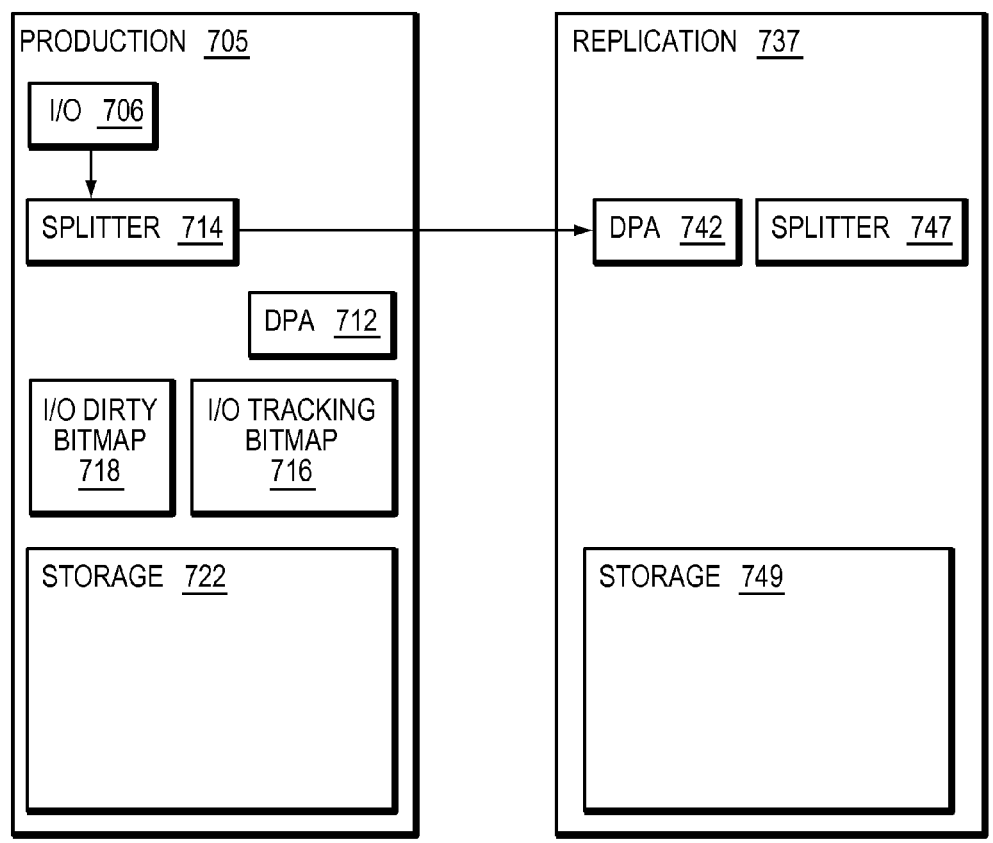
FIG. 7 is a simplified illustration of a data protection system during snapshot replication, in accordance with an embodiment of the present disclosure.
Figure 8:
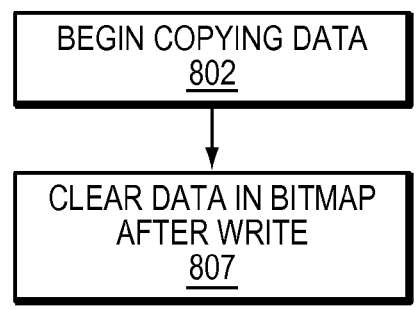
FIG. 8 is a simplified example of a method for snapshot replication, in accordance with an embodiment of the present disclosure.
Figure 9:
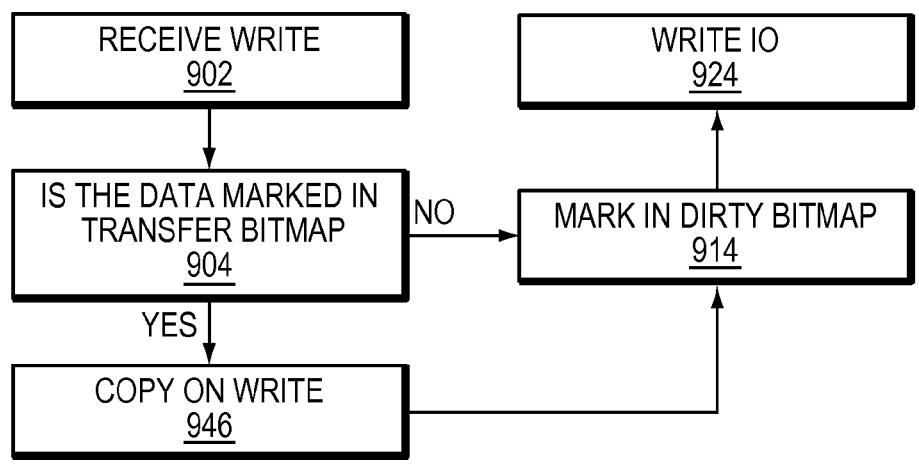
FIG. 9 is an alternative simplified example of a method for snapshot replication, in accordance with an embodiment of the present disclosure.

Refer now to the simplified examples embodiments of FIGS. 7, 8, and 9, which illustrate a snapshot push from a production site to a replication site during snapshot replication. Production site 705 has splitter 714, DPA 712, 10 dirty bitmap 718, 10 tracking bitmap 716, and storage 722.

In most embodiments, the dirty bitmap may contain the list of data that needs to be pushed to replica site, while the tracking bitmap may contain the locations changes since the start of the push of a snapshot.

Replication site 737 has DPA 743, journal 747, and storage 749. Production site 705 begins copying data from a snapshot image to replication site 737 (step 802). In this embodiment, the data that is transferred refers to the data that has been recorded as having changed in tracking bitmap 716 since a last snapshot was sent to replication site 737. Once the snapshot image is marked for transfer, bitmap 716 is renamed to become bitmap 718, and a fresh bitmap 716 is created for tracking new changes. As the data is transferred according to dirty bitmap 718, the portion of dirty bitmap 718 corresponding to the data transferred to replication site 737 is marked as transferred (step 807).

In many embodiments, this may correspond to clearing the bit corresponding to dirty data in dirty bitmap 718. The dirty data location which are marked in bitmap 718 are read by splitter 714 and sent to replication appliance 712.

During the transfer of the differential data, write IO 706 is received (step 902). A determination is made if the data corresponding to write IO 706 is marked as dirty in dirty bitmap 718 (step 904). A copy on write occurs transferring the data to replication site 737 (step 946) meaning data which should be pushed to the replica site is being read from the volume and sent to DPA 712 The dirty bit is being cleared from dirty bitmap 718 as data is transferred to DPA 712.

The portion of the dirty bitmap corresponding to IO 706 is marked as dirty in tracking bitmap 716 (step 914). Write IO 706 is sent to storage 722 (step 924) and acknowledged to host. Following completion of the transfer of the data in dirty bitmap 718, tracking bitmap 716 corresponds to the data that has changed on production site 705 while the snapshot was being transferred to replication site 737. Tracking bitmap 716 continues to track writes occurring on production site 705 and may be used as the dirty bitmap the next time a snapshot is to be transferred. In most embodiments while in snapshot replication, a snapshot may not be closed on the replication site until a full snapshot has been transferred from the production site.

In most embodiments, when the next snapshot is marked for transfer between production and replication, the tracking and dirty bitmap may be switched, i.e. bitmap 718 gets the data of bitmap 716, and bitmap 716 becomes clear (gets the current data of 718). In certain embodiments once a snapshot is transferred, the dirty bitmap may be cleared and the transferred bitmap may hold the differences to be transferred to the replication site. In other embodiments, if the initialization is a first time initialization all the data in the dirty bitmap may be marked as dirty.

Replication Switching

Figure 10:
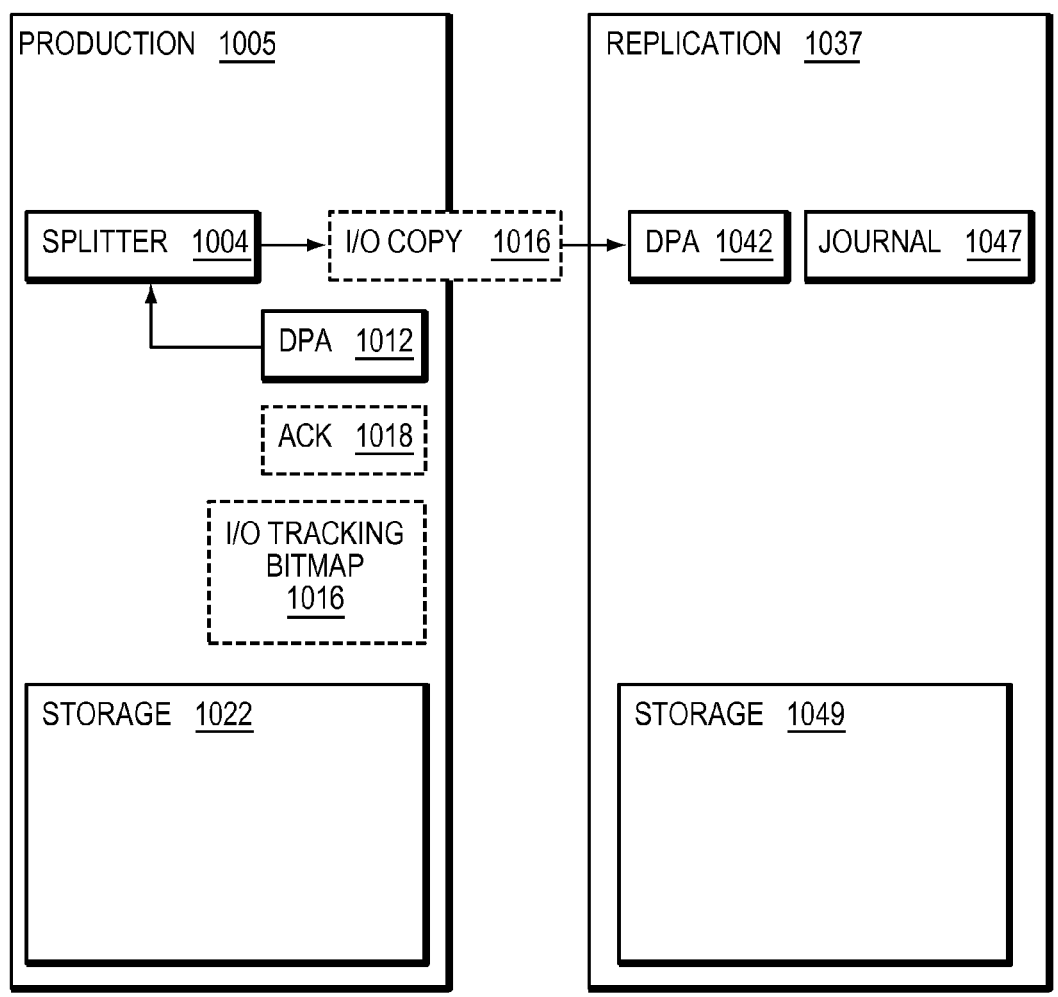
FIG. 10 is a simplified illustration of a data protection system transitioning from continuous replication to snapshot replication, in accordance with an embodiment of the present disclosure.
Figure 11:
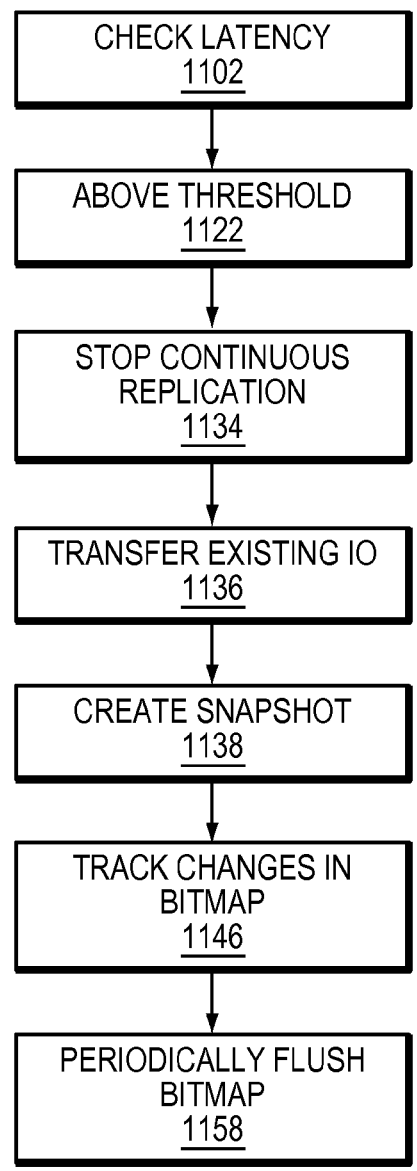
FIG. 11 is a simplified example of a method for transitioning from continuous replication to snapshot replication, in accordance with an embodiment of the present disclosure.

Refer now to the simplified example embodiments of FIGS. 10 and 11, which illustrate a shift from continuous replication to snapshot replication. In these embodiments, in continuous replication, copies of IO on the production site, such as IO copy 1016, are being sent to replication appliance 1012 prior to acknowledging them to host. The continuous replication process in these embodiments may be similar to that described in FIGS. 3 and 4.

The latency is checked for the time it takes for the continuous replication to occur (step 1102), i.e. the delay added by splitting the data to the replication appliance. A determination is made if the replication latency is above a threshold (step 1122). If the latency is above the threshold, continuous replication is stopped (step 1134). Existing IO are transferred to replication site 1037 (step 1136). A tracking bitmap is created on the replication site with all transferred IO (step 1138) Changes that occur on production site 1005 after continuous replication is stopped are tracked in tracking bitmap (step 1146). Periodically, the changes noted in bitmap 1016 are replicated to the replication site 1037 (step 1158). In these embodiments, the changes may be replicated to the replication site as described in the example embodiments of FIGS. 7-9, moving tracking bitmap into dirty bitmap and starting a new tracking bitmap.

Figure 12:
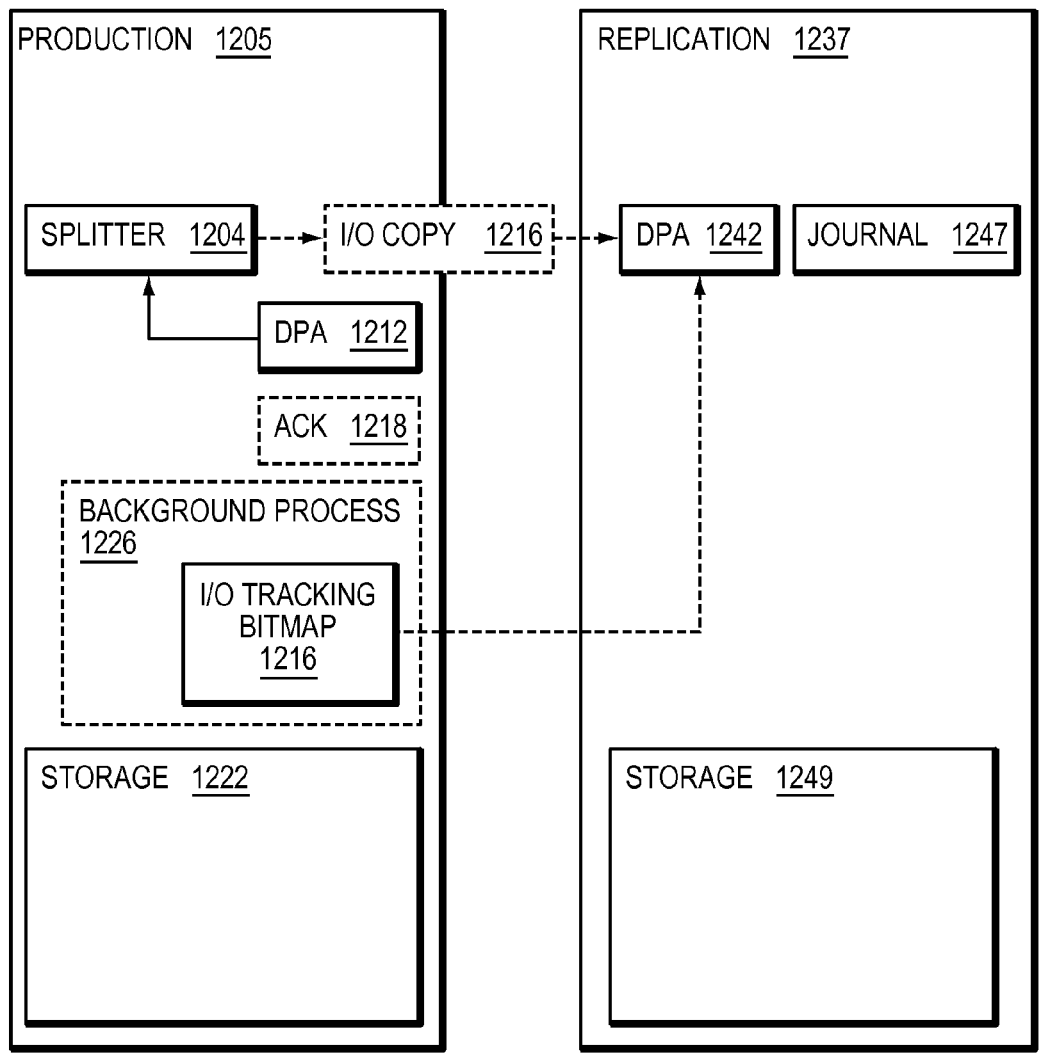
FIG. 12 is a simplified illustration of a data protection system transitioning from snapshot replication to continuous replication, in accordance with an embodiment of the present disclosure.
Figure 13:
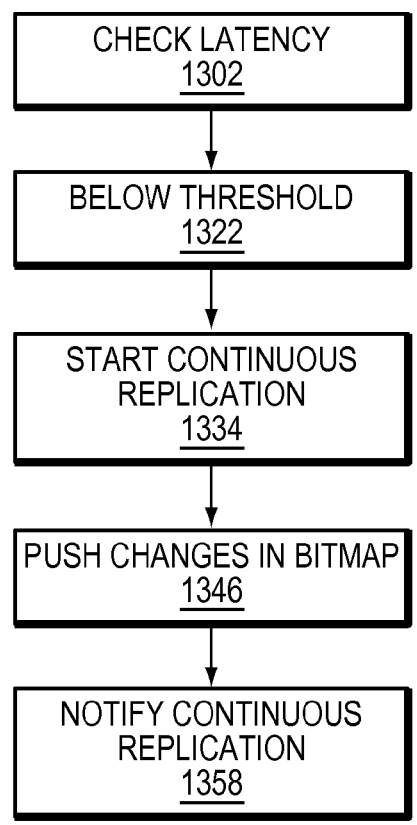
FIG. 13 is a simplified example of a method for transitioning from snapshot replication to continuous replication, in accordance with an embodiment of the present disclosure.

Refer now to the simplified example embodiments of FIGS. 12 and 13, which represent switching from snapshot replication to continuous replication. A check is made to determine the possible latency of the replication, by checking if the IO activity is below some threshold, and the DPA response time is below some threshold (step 1302). It is determined if the replication is below a threshold (1322). If the replication latency is below a threshold, continuous replication is started (step 1334). In these embodiments, continuous replication occurs as described in FIGS. 3 and 4, where IO copy 1016 is sent to DPA 1202 and acknowledgement 1018 is received at production site 1005 before IO is sent to storage 1022. In these embodiments, background process 1226 pushes the changes noted in tracking bitmap 1216 to replication site 1237 (step 1346). In this embodiment, if during background push an IO arrives a copy on write (i.e. data is read by the splitter and sent to the DPA 1212) occurs and the current data in the volume is pushed to the DPA prior to allowing the write to complete to the volume. When all of the changes to dirty bitmap 1216 have been transferred to replication site 1237, the replication environment is notified that it is in continuous replication (step 1358). In most embodiments, a bookmark indicating consistent points in time in journal 1247 may be closed at any point during continuous replication. In further embodiments, a bookmark may be closed during snapshot replication when a full snapshot has been transferred.

Figure 14:
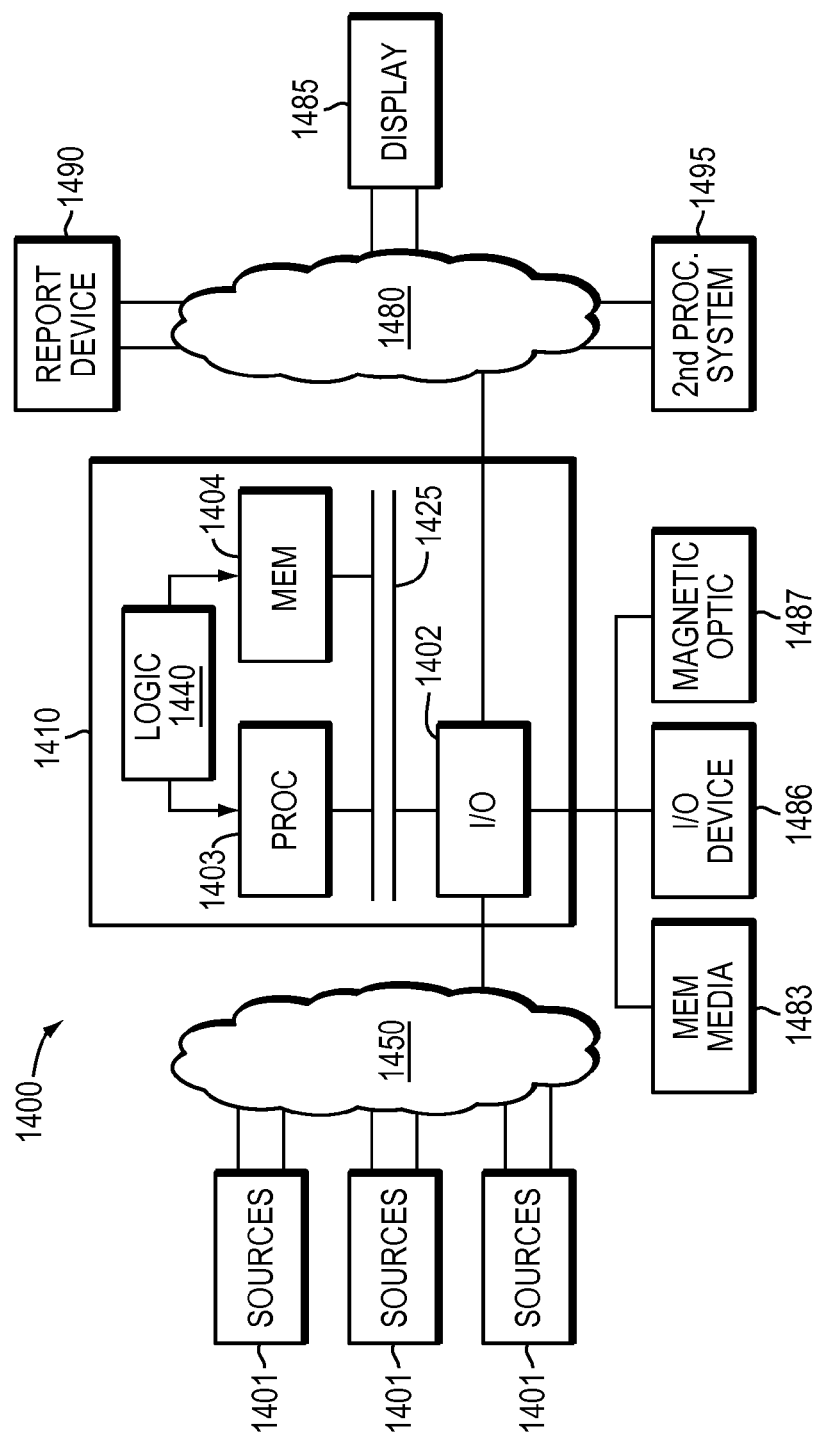
FIG. 14 is an example of an embodiment of an apparatus that may utilize the techniques described herein, in accordance with an embodiment of the present disclosure.
Figure 15:
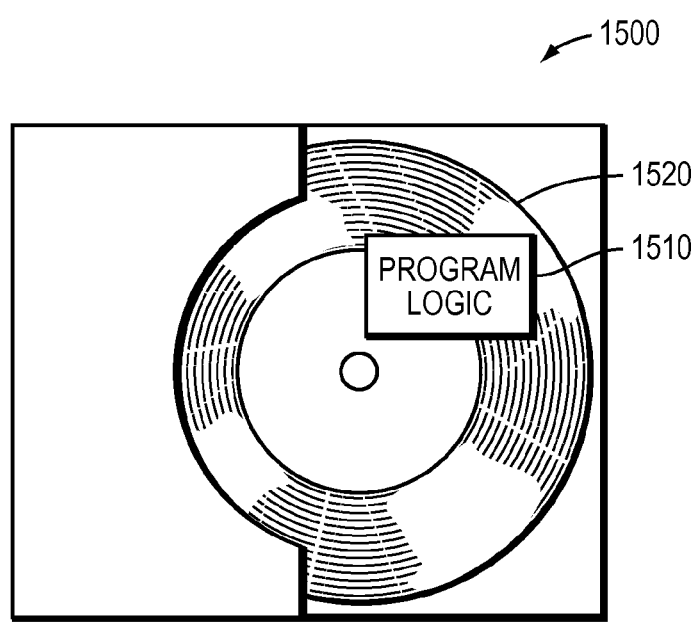
FIG. 15 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 14, the machine becomes an apparatus for practicing the invention. When implemented on one or more general-purpose processors, the program code combines with such a processor 1403 to provide a unique apparatus that operates analogously to specific logic circuits. As such a general purpose digital machine can be transformed into a special purpose digital machine. FIG. 15 shows Program Logic 1534 embodied on a computer-readable medium 1530 as shown, and wherein the Logic is encoded in computer-executable code configured for carrying out the reservation service process of this invention and thereby forming a Computer Program Product 1500. The logic 1534 may be the same logic 1440 on memory 1404 loaded on processor 1403. The program logic may also be embodied in software modules, as modules, or as hardware modules.

The logic for carrying out the method may be embodied as part of the system described below, which is useful for carrying out a method described with reference to embodiments shown in, for example, FIG. 4, FIG. 5 and FIG. 9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system for data replication, the system comprising:
a production site having a splitter and storage; where in the production site is in communication with a production host;
a replication site; wherein IO sent from the production site is replicated to the replication site via the splitter; and
computer-executable logic operating in memory, wherein the computer-executable program logic is configured for execution of:
dynamically changing between snapshot hot push replication and continuous replication; wherein snapshot hot push denotes a replication mode where a snapshot is pushed from the production site to the replication site while IO occurs to the production site and wherein continuous replication denotes a replication mode wherein replicated IO is sent to a replication appliance prior to acknowledging the replicated IO to the production host; wherein the switching of the snapshot replication mode to continuous replication comprises: transferring data for location marked in a dirty bitmap to the replication appliance; tracking new IOs arriving in a tracking bitmap; when an IO arrives to a volume, checking if bitmap is dirty; and if the bitmap is determined to be dirty, reading the data from volume and sending the data to the replication appliance prior to accepting the IO and tracking it in a tracking bitmap.

2. The system of claim 1 wherein changing replication mode is based on:
checking a latency of IO from the production host IO; wherein the latency corresponds to the time it takes the storage to acknowledge the IO to the production host;
determining whether to switch from a current replication mode to a different replication mode;
based on a positive determination to switch from a current to a different replication mode, if the current replication mode is a continuous replication mode, dynamically switching the replication mode from continuous replication to snapshot replication; and if the current replication mode is a snapshot replication mode dynamically switching the replication mode from snapshot replication to continuous replication.

3. The system of claim 2 wherein the determination is made based on user configuration.

4. The system of claim 1 wherein the switching of the replication mode from snapshot replication mode to continuous replication comprises:
splitting IOs to the replication appliance;
transferring in a background process the differences in a tracking bitmap between the production site and the replication site; and
upon transferring of the changes in the tracking bitmap, notifying the system that it is in continuous replication mode.

5. The system of claim 1 wherein the switching of continuous replication mode to snapshot hot push mode comprises:
initializing a dirty bitmap on the replication site of an image on the production site.

6. A computer implemented method comprising:
dynamically changing between snapshot hot push and continuous replication; wherein snapshot hot push denotes a replication mode where a snapshot is pushed from a production site to a replication site while IO occurs to the production site and wherein continuous replication denotes a replication mode wherein replicated IO is sent to a replication appliance on the replication site prior to acknowledging the IO to the production host; wherein the switching of the snapshot replication mode to continuous replication comprises: transferring data for location marked in a dirty bitmap to the replication appliance; tracking new IOs arriving in a tracking bitmap; when an IO arrives to a volume, checking if bitmap is dirty; and if the bitmap is determined to be dirty, reading the data from volume and sending the data to the replication appliance prior to accepting the IO and tracking it in a tracking bitmap.

7. The method of claim 6 wherein changing replication mode is based on
checking a latency of IO from the production host IO; wherein the latency corresponds to the time it takes the storage to acknowledge the IO to the production host;
determining whether to switch from a current replication mode to a different replication mode;
based on a positive determination to switch from a current to a different replication mode, if the current replication mode is a continuous replication mode, dynamically switching the replication mode from continuous replication to snapshot replication; and if the current replication mode is a snapshot replication mode dynamically switching the replication mode from snapshot replication to continuous replication.

8. The method of claim 6 wherein the switching of the replication mode from snapshot replication mode to continuous replication comprises:
splitting IOs to the replication appliance;
transferring in a background process the differences in a tracking bitmap between the production site and the replication site; and
upon transferring of the changes in the tracking bitmap, notifying the system that it is in continuous replication mode.

9. The method of claim 6 wherein the switching of continuous replication mode to continuous replication snapshot hot push mode comprises:
initializing a dirty bitmap on the replication site of an image on the production site.

10. A computer program product for use in replication comprising:
a non-transitory computer readable medium encoded with computer executable program code for replication of data, the code configured to enable the execution of:
dynamically changing between snapshot hot push and continuous replication; wherein snapshot hot push denotes a replication mode where a snapshot is pushed from a production site to a replication site while IO occurs to the production site and wherein continuous replication denotes a replication mode wherein replicated IO is sent to a replication appliance prior to acknowledging the IO to the production host; wherein the switching of the snapshot replication mode to continuous replication comprises: transferring data for location marked in a dirty bitmap to the replication appliance; tracking new IOs arriving in a tracking bitmap; when an IO arrives to a volume, checking if bitmap is dirty; and if the bitmap is determined to be dirty, reading the data from volume and sending the data to the replication appliance prior to accepting the IO and tracking it in a tracking bitmap.

11. The computer program product of claim 10 wherein a storage entity is a virtual volume (VVOL) and has a VMware vSphere API for Storage Awareness (VASA) control path.

12. The computer program product of claim 10 wherein changing replication mode is based on
   checking a latency of IO from the production host IO; wherein the latency corresponds to the time it takes the storage to acknowledge the IO to the production host;
   determining whether to switch from a current replication mode to a different replication mode;
   based on a positive determination to switch from a current to a different replication mode, if the current replication mode is a continuous replication mode, dynamically switching the replication mode from continuous replication to snapshot replication; and if the current replication mode is a snapshot replication mode dynamically switching the replication mode from snapshot replication to continuous replication.

13. The computer program product of claim 12 wherein the determination is made based on user configuration.

14. The computer program product of claim 10 wherein the switching of the replication mode from snapshot replication mode to continuous replication comprises:
   splitting IOs to the replication appliance;
   transferring in a background process the differences in a tracking bitmap between the production site and the replication site; and
   upon transferring of the changes in the tracking bitmap, notifying the system that it is in continuous replication mode.

15. The computer program product of claim 14 wherein the switching of continuous replication mode to snapshot hot push mode comprises:
   initializing a dirty bitmap on the replication site of an image on the production site.

16. The computer program product of claim 13 wherein the switching of the replication mode from snapshot hot push mode to continuous replication comprises:
   transferring data for location marked in a dirty bitmap to replication appliance, and tracking new IOs arriving in a tracking bitmap.

* * * * *